United States Patent [19]

Blavignac et al.

[11] Patent Number: 5,200,012
[45] Date of Patent: Apr. 6, 1993

[54] METHOD FOR EMBODYING BY FILAMENTARY WINDING AN ANNULAR CAISSON EQUIPPED WITH INTERNAL STIFFENERS

[75] Inventors: Guy Blavignac, La Teste; Jean Dessaut, Bordeaux; Patrick Godin, Arsac; Jean-Luc Pavec, Margaux, all of France

[73] Assignee: Aerospatiale Societe National Industrielle, Paris, France

[21] Appl. No.: 625,402

[22] Filed: Dec. 11, 1990

[30] Foreign Application Priority Data

Dec. 19, 1989 [FR] France ............... 89 16777

[51] Int. Cl.⁵ .................................. B31C 13/00
[52] U.S. Cl. ................ 156/169; 156/155; 156/173; 156/191; 405/288
[58] Field of Search ........ 405/8, 11, 12, 272, 405/133, 288; 156/169, 172, 191, 189, 425, 155, 173, 192, 267; 138/148, 113, 115, 116

[56] References Cited

U.S. PATENT DOCUMENTS

| 3,020,956 | 2/1962 | Suderow | 405/8 |
| 3,607,504 | 9/1971 | Howard | 156/191 |
| 4,634,314 | 1/1987 | Pierce | 405/195 |
| 4,710,412 | 12/1987 | Darrieux | 244/54 |
| 4,854,778 | 8/1989 | Valenzuela | 405/195 |

FOREIGN PATENT DOCUMENTS

| 0165163 | 12/1985 | European Pat. Off. | |
| 3316539 | 4/1984 | Fed. Rep. of Germany. | |
| 2565159 | 12/1985 | France. | |
| 58-17072 | 2/1983 | Japan | 156/172 |
| 2257835 | 11/1987 | Japan | 156/172 |
| 0252971 | 2/1970 | U.S.S.R. | 405/8 |

Primary Examiner—Michael W. Ball
Assistant Examiner—Daniel J. Stemmer
Attorney, Agent, or Firm—Nikaido, Marmelstein, Murray & Oram

[57] ABSTRACT

The method consists of separately embodying, by means of filamentary winding, the internal wall 11 of an annular caisson on a primary mandrel 9, of securing to this wall separately prefabricated stiffening elements 3, of juxtaposing to the primary mandrel an interpolated mandrel 17 inserted between the stiffening elements, of embodying above said interpolated mandrel the lateral walls and the external wall 12 of the caisson and of removing the single-piece assembly from the interpolated mandrel elements enclosed in the caisson.

Application for the embodiment of load-bearing structures.

8 Claims, 3 Drawing Sheets

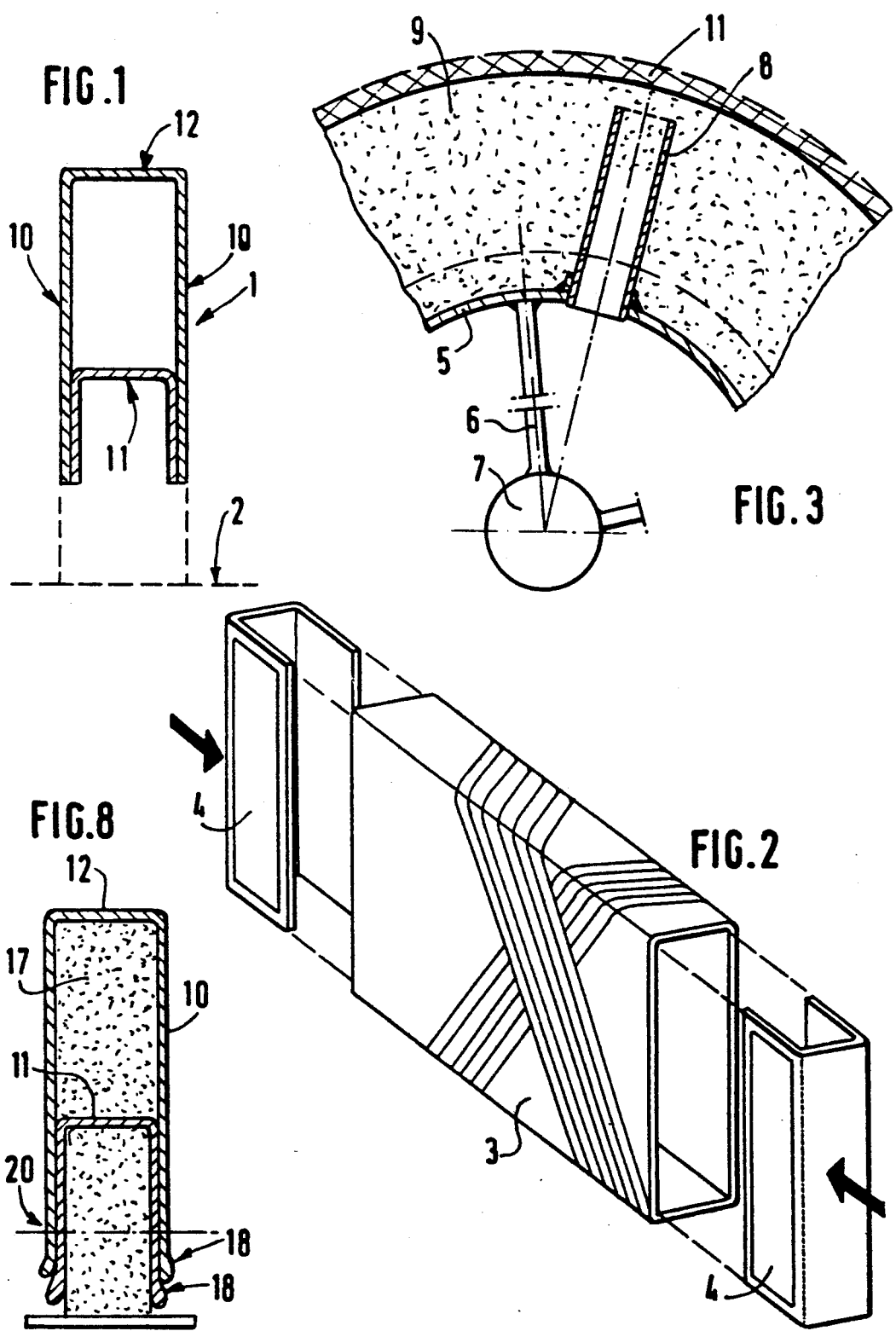

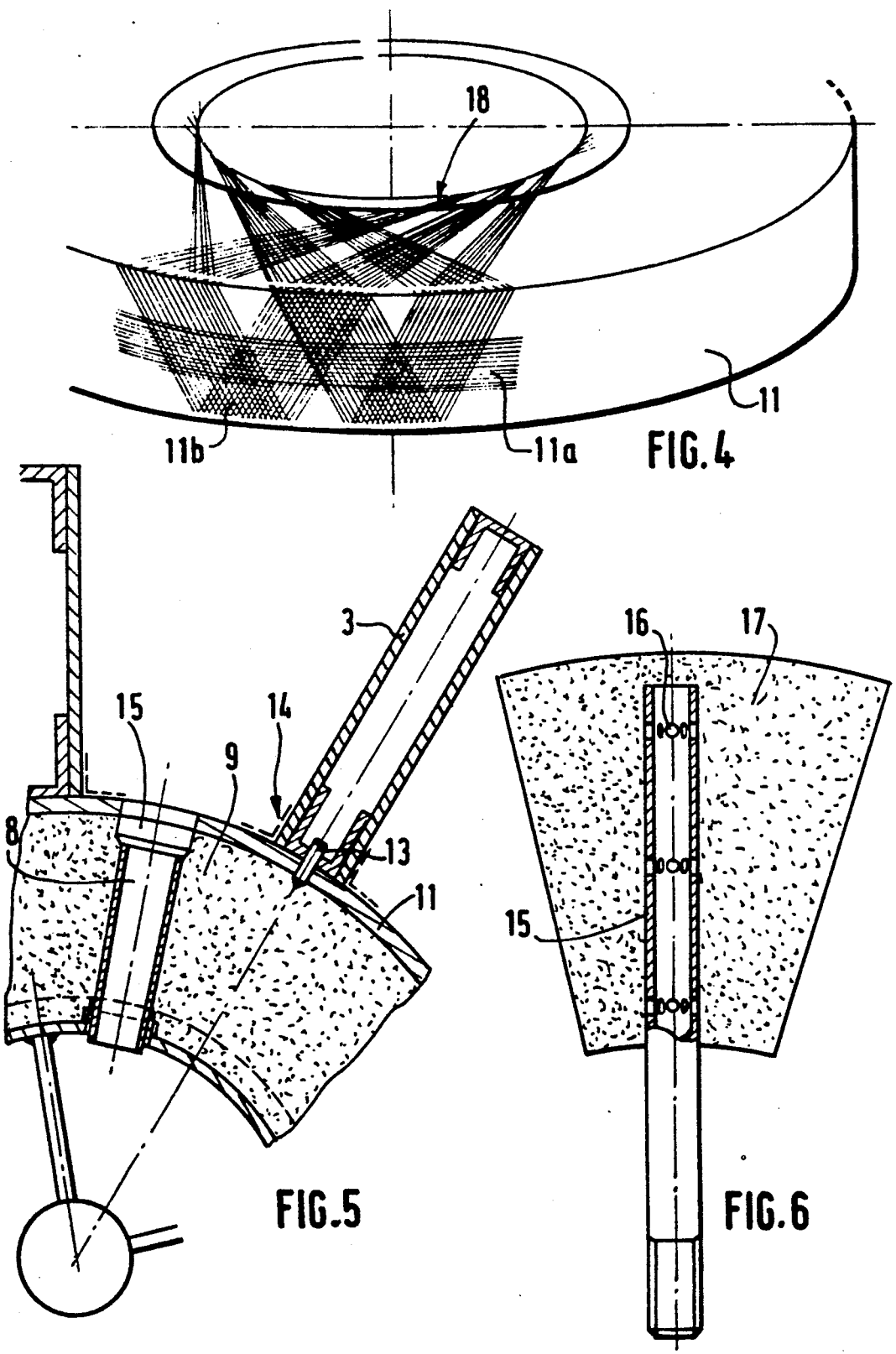

METHOD FOR EMBODYING BY FILAMENTARY WINDING AN ANNULAR CAISSON EQUIPPED WITH INTERNAL STIFFENERS

The invention concerns a load-bearing structure and more particularly a method for embodying by filamentary winding a hollow-section single-piece closed up annular caisson integrating stiffening elements enabling it to operate under complex mechanical stresses and having a minimum mass for a specifically imposed spatial requirement and rigidity.

This type of part currently appears in the form of a metallic braced structure or caisson composed of an assembly of elements interconnected by mechanically-welded, riveted or bolted links, this type of part usually requiring the embodiment of complex reinforcements. The drawback with this type of production is its high cost resulting from the large number of materials required and the considerable amount of time involved, especially for machining, mounting and assembling the elements, having regard also to the difficulties of automation.

To overcome these drawbacks, it has been proposed to embody these parts from materials with fiber-reinforced resin, these materials having the advantage of reducing the weight of the structure. To this effect and so as to facilitate the manufacture of structures with complex shapes, it has been envisaged, as described in the French patent FR-A 2565159 in the name of the applicant, to propose a production method according to which the reinforcement to be embodied is split up into a plurality of elementary parts able to be embodied separately by filamentary winding. Thus, some of these parts are embodied on shaping mandrels from which they are extracted and machined so as to be assembled into sub-assemblies. On the other hand, other parts are embodied by filamentary winding on a mandrel, at least one part of this mandrel being constituted by said sub-assemblies.

Compared with a metallic version, it is thus possible to reduce the weight of the structure by 30% and reduce the cost of production by the fact that the number of parts to be assembled is reduced, the geometry of the parts involved is simplified, machining operations are significantly reduced and the links are simplified. In addition, the material and tools used are kept to a minimum. This version obtained by filamentary winding also has the advantage of significantly limiting the risks of corrosion.

However, this known method does not make it possible to easily obtain a specific part embodiment which is a closed hollow-section annular part equipped with internal stiffeners.

Thus, the object of the present invention is to propose a particular method to embody by filamentary winding this annular part to be integrated into a more complex structure.

Accordingly, the invention concerns a method for embodying by filamentary winding an annular caisson equipped with internal stiffeners, this method mainly consisting of:
- separately embodying by filamentary winding the internal wall of an annular caisson on a primary mandrel,
- securing to this wall the separately prefabricated stiffener elements,
- juxtaposing to the primary mandrel an interpolated mandrel disposed between the stiffener elements,
- embodying above said interpolated mandrel and by filamentary winding the lateral and external walls of the caisson,
- and after polymerization and machining, remove the single-piece assembly from the interpolated mandrels elements enclosed in the caisson.

According to one particular characteristic of the invention, the primary mandrel is supported by a circular rim borne by a hub by means of radial brackets and constituted by agglomerated sand maintained by a plurality of anchoring tubes. Advantageously, the internal wall of the annular caisson is constituted by one circumferential winding and one satellite winding with slanted layers. According to another characteristic of the invention, each stiffening element is embodied firstly by the filamentary winding of radial disks and secondly by the filamentary winding of inserts followed by engaging said inserts at each extremity of a radial disk.

Also according to the invention, a positioning tube is secured to the anchoring tubes, said positioning tube being pierced with small orifices and extending into the intermediate zones between the stiffener elements and which is intended to maintain the interpolated mandrel, the winding of the lateral and external walls of the caisson above the interpolated mandrel being followed by a cutting after polymerization of the flanges at the level where this cutting is to be made.

Other particular characteristics and the advantages of the invention shall appear more readily from a reading of the description following examples of embodiments with reference to the accompanying drawings which represent:

FIG. 1 is a cross sectional diagrammatic view of a closed annular caisson,

FIG. 2 is an exploded perspective view of a stiffening element,

FIG. 3 is a a partial sectional view of the primary mandrel,

FIG. 4 is a diagrammatic view of the type of winding of the internal wall of the caisson, FIG. 5 is a view of the primary mandrel equipped with stiffening elements, FIG. 6 is a partial view of the interpolated mandrel, FIG. 8 is a cross sectional diagrammatic view of a caisson before cutting of the flanges.

Figure 7:
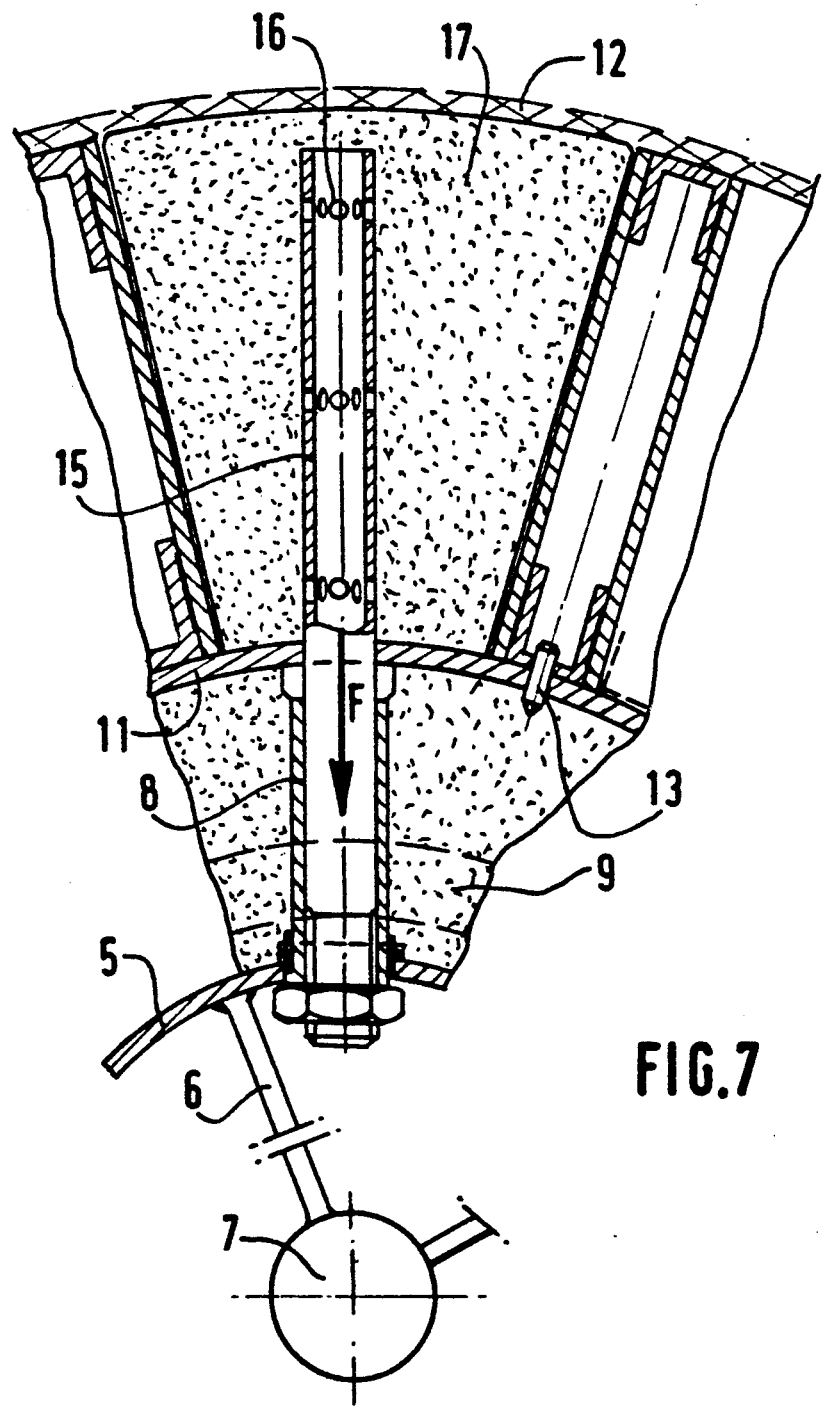
FIG. 7 is a view of the primary and interpolated mandrels.

FIG. 1 shows one portion of a closed annular caisson 1 with an axis 2 and made of a composite material, namely a continous high-performance fiber coated with epoxy resin. The caisson 1 is hollow with a rectangular radial section. It is limited by lateral walls 10, one internal wall 11 and one external wall 12. Into the hollow space of this caisson, stiffening elements are incorporated constituted by rectangular-shaped radial disks. The fiber used is preferably high module carbon associated with an epoxy resin, this pairing making it possible to attain the weight and rigidity objectives. In order to achieve this, the filamentary winding method is used on a digital control machine guaranteeing the definition parameters (orientation of fibers and thicknesses) and similarly their reproducability.

FIG. 2 shows one embodiment of such a stiffener element. It initially consists of embodying by filamentary winding on a rectangular sectional mandrel with a shape adapted to the radial disks 3, followed with polymerization, machining and extraction of the mandrel.

Then end inserts 4 of these disks are embodied according to the same method. The method is completed by engaging the inserts 4 at each end of the disk 3 and inside its hollow space, as shown by the arrows.

FIG. 3 shows the embodiment by filamentary winding of the internal wall of the annular caisson. The primary mandrel used to this effect is supported by a circular metallic rim 5 mounted on a set of radial brackets 6 borne by a central hub 7 serving as a support and for the driving in rotation on the rotating machine. An anchoring tube 8 screwed onto the convex portion of the rim 5 is used to maintain the agglomerated sand which constitutes this primary mandrel 9. The internal wall 11 of the caisson 1 is formed by filamentary winding on the mandrel followed by polymerization.

FIG. 4 shows by way of example a "cycloprofile" winding of the internal wall 11 of the caisson constituted by one circumferential winding 11a and one satellite winding 11b with slanted layers, which results in the formation of flanges 18 at the level of the central round.

Once this internal wall of the caisson is completed, the lateral walls and the external wall of the caisson are then embodied.

As shown on FIG. 5, this operation starts by firstly securing to the external wall of the caisson, that is on the internal wall 11 of the caisson, the previously embodied stiffening elements 3. These elements are glued transversally to the primary mandrel 9 or fixed by tenons 13 to the outside of the wall 11. A reinforcement adhesive 14 is advantageously applied to the joining point of the two pieces. In addition, a passage hole 15 is drilled into the wall at the right of the anchoring tubes 8.

The anchoring tube 8 then receives a positioning tube 19 pierced with small orifices 16, this positioning tube extending into the intermediate zones between the stiffener elements and is used to maintain an interpolated mandrel 17, for example constituted by sand agglomerated by a bonding material soluble in water (FIGS. 6 and 7).

Then the lateral walls 10 and the external walls 12 of the caisson are embodied around this interpolated mandrel 17 by filamentary winding. This winding is followed by a polymerization and then, as shown on FIG. 8, by a cutting of the small flanges 18 due to the winding of the cycloprofiles at the sought-after cutting level. By injecting water through the positioning tube 15 and the orifices 16, the sand mandrel portions constituting the interpolated mandrel are eliminated. It then merely remains to free the positioning tubes 19 from the interpolated mandrel by means of the anchoring tube 8 in the direction of the arrow F and then the anchoring tubes themselves. The internal wall of the caisson shall thus comprise holes easily to be blocked off by bonded stoppers.

We claim:

1. Method for forming a filament wound annular caisson equipped with internal stiffeners, said method comprising:
   providing a primary mandrel having an inner rim and a central hub, said central hub supporting said inner rim, with agglomerated sand supported by said inner rim;
   separately forming an internal wall (11) of the annular caisson (1) on a primary mandrel (9) by filament winding with resin impregnated filaments,
   securing separately prefabricated stiffening elements (3, 4) to said internal wall,
   placing agglomerated sand between said stiffening elements, (17), said agglomerated sand forming interpolated mandrels between the stiffening elements,
   forming lateral (10) and external (12) walls of the caisson by filament winding with resin impregnated filaments over said interpolated mandrels, said filament winding forming flanges about a central portion of said caisson,
   polymerizing said resin, removing said flanges by cutting,
   separating the agglomerated sand forming the interpolated mandrels from the caisson, said caisson comprising lateral, external and internal walls formed by said filament winding, with said internal stiffening elements disposed between said internal wall and said external walls.

2. Method according to claim 1, wherein said inner rim has a circular shape, and is attached to said central hub by radial brackets, and said agglomerated sand is further supported by a plurality of anchoring tubes (8).

3. Method according to claims 1 or 2, wherein the internal wall (11) of the annular caisson (1) is formed by one circumferential winding wound around an outer circumference of said primary mandrel and one satellite winding, said satellite winding comprising winding the primary mandrel with slanted layers wound angularly with respect to the center axis of the primary mandrel, forming said flanges at a level of the inner rim.

4. Method according to claim 1, wherein each stiffening element is formed by: filament winding a radial support; filament winding inserts; and then engaging said inserts at each end of said radial support to form the stiffening element.

5. Method according to claims 1 or 2, wherein a reinforcement adhesive (14) is applied to each of a plurality of connecting points, said connecting points being formed where each stiffening element contacts the internal wall (11) of the annular caisson (1).

6. Method according to claim 2, wherein a positioning tube (19) pierced with small orifices (16) is secured to an anchoring tube (8), said positioning tube extending into an intermediate zone between the stiffening elements (3, 4) and which is intended to support the agglomerated sand forming one of said interpolated mandrels (17).

7. Method according to claim 1, wherein the filament winding of the lateral (10) and external (12) walls of the caisson over the interpolated mandrels (17) is followed by said removing of said flanges, after polymerization of said resin.

8. Method according to claim 6, wherein the agglomerated sand of the interpolated mandrels is separated from said caisson by injecting water through the positioning tube (15) and the orifices, thereby removing said agglomerated sand and said water through said anchoring tubes (8).

* * * * *